Sept. 26, 1967   R. A. POLLARD ET AL   3,343,189
RESCUE LITTER FLOATATION ASSEMBLY
Filed Aug. 24, 1965   5 Sheets-Sheet 5

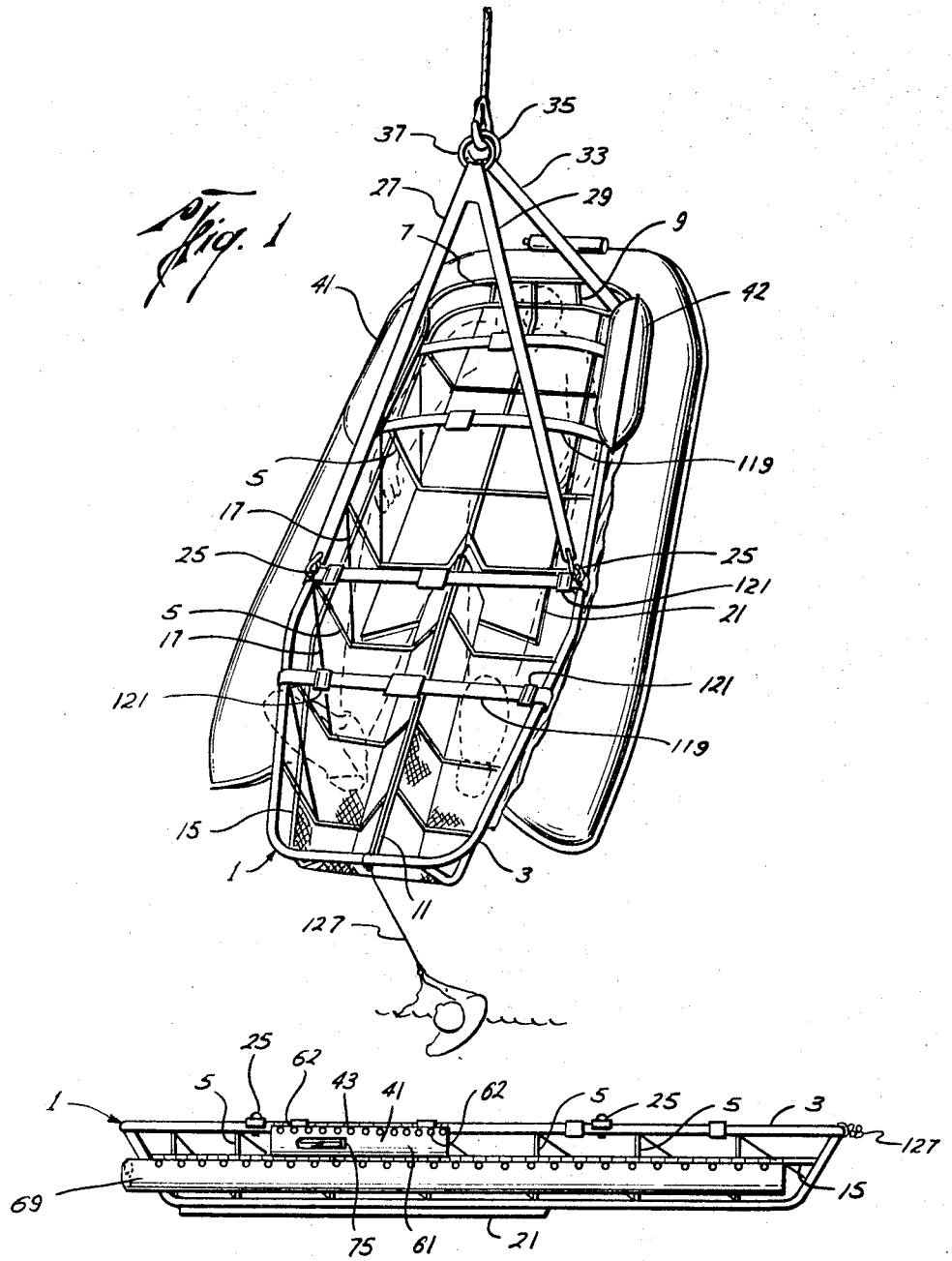

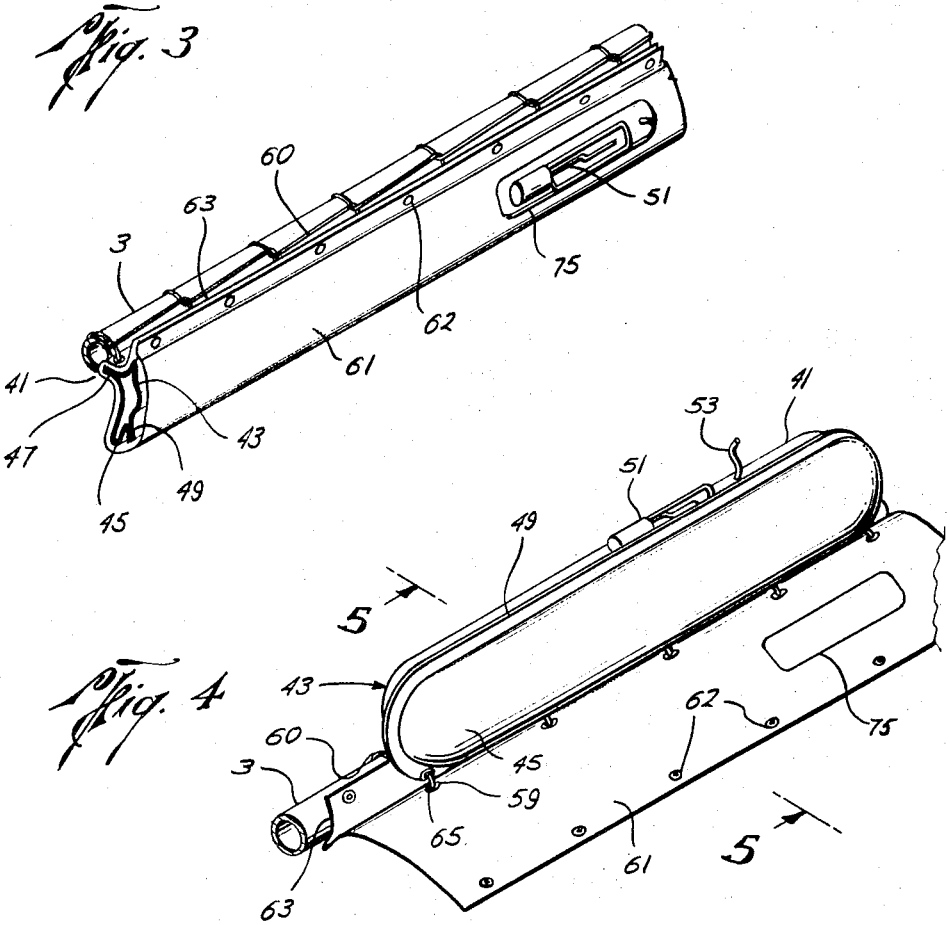
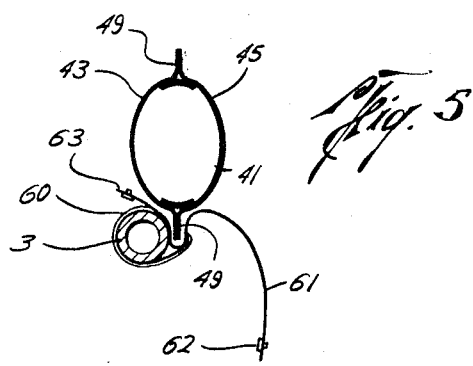

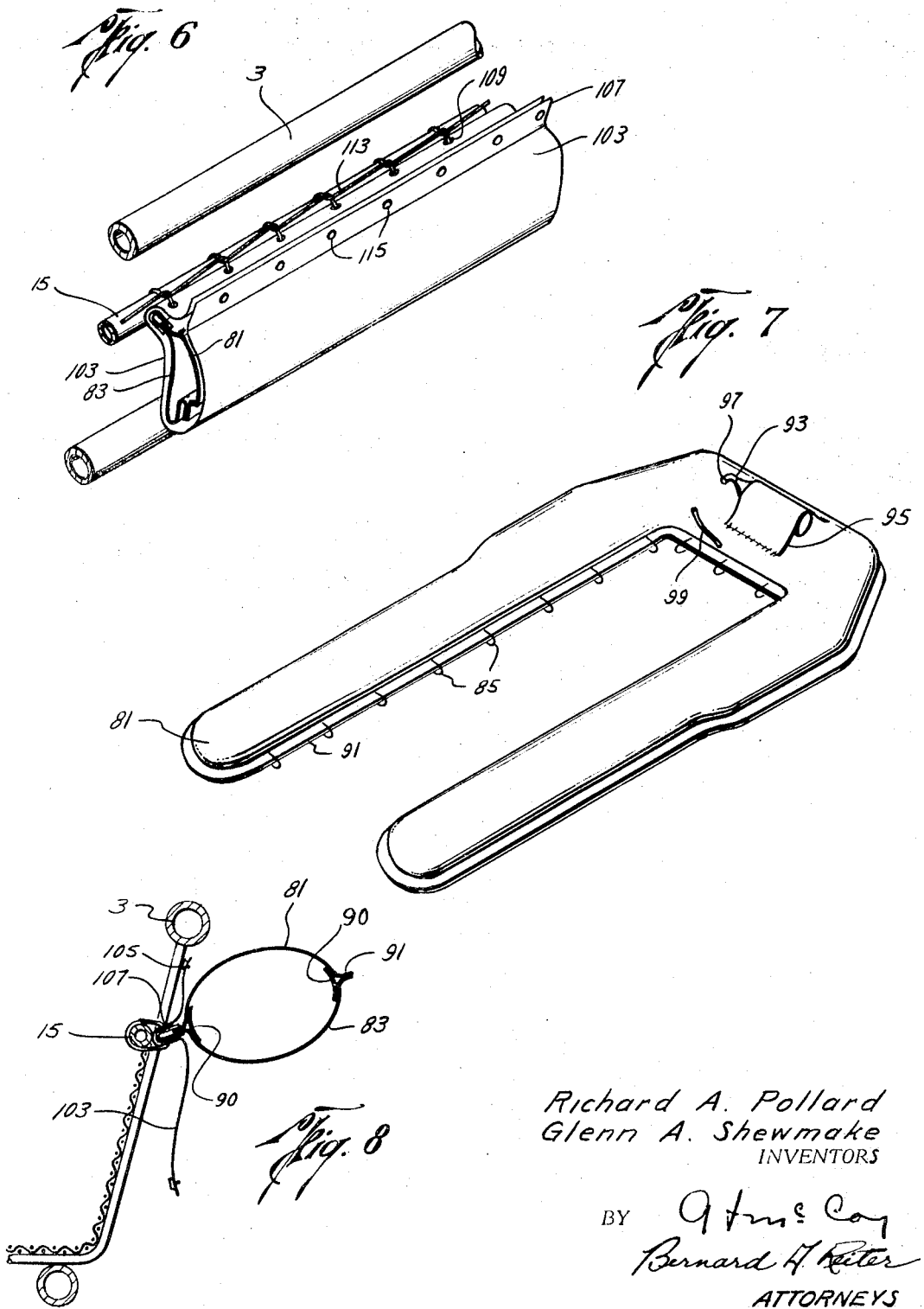

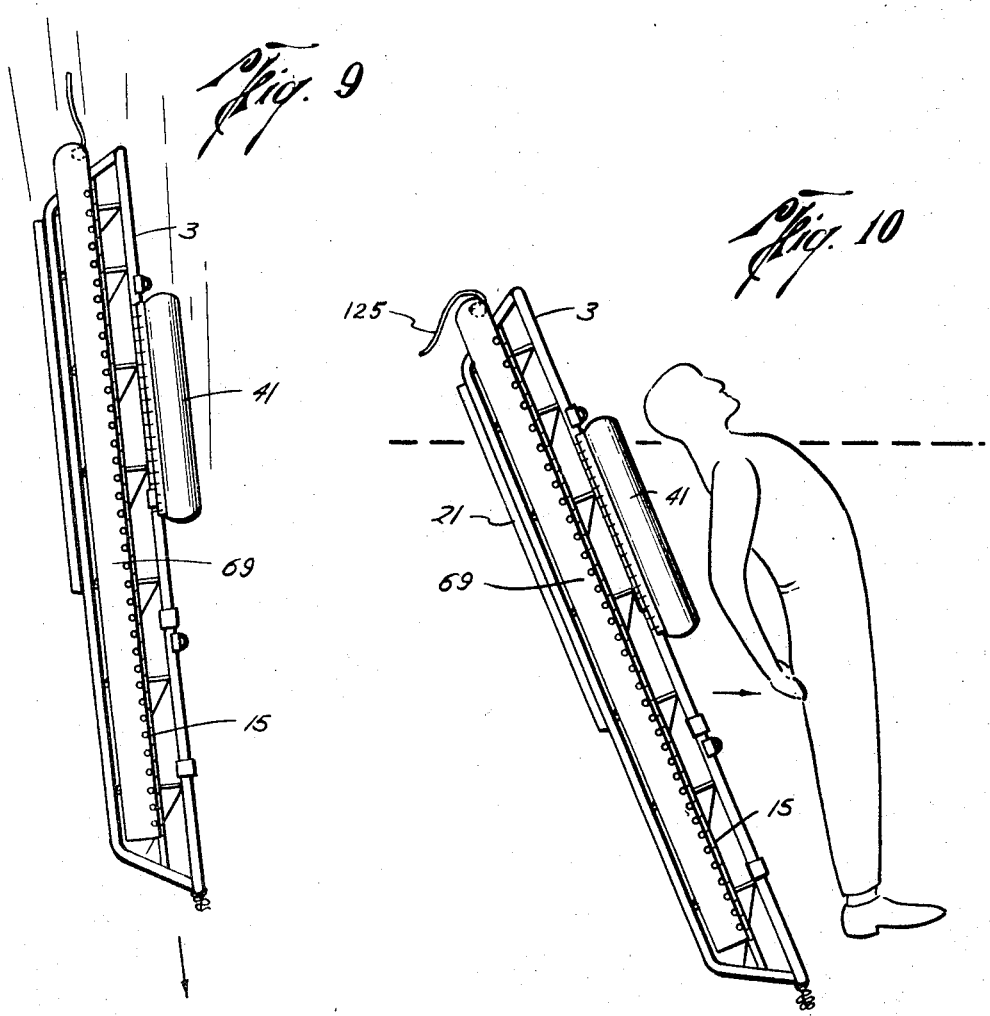

Richard A. Pollard
Glenn A. Shewmake
INVENTORS

BY
ATTORNEYS

United States Patent Office 3,343,189
Patented Sept. 26, 1967

3,343,189
RESCUE LITTER FLOATATION ASSEMBLY
Richard A. Pollard and Glenn A. Shewmake, Houston, Tex., assignors to the United States of America as represented by the Administrator of the National Aeronautics and Space Administration
Filed Aug. 24, 1965, Ser. No. 482,311
5 Claims. (Cl. 9—312)

ABSTRACT OF THE DISCLOSURE

A rescue device comprising a Stokes-type litter which has a float means at its head end and an inflatable tube means at its foot end, said tube means being in a deflated condition when said device is initially placed in the water. To effect a rescue of an injured swimmer, the device is dropped into the water. The float means will cause the litter to float in a substantially vertical position, head end up. The float is moved to the swimmer who is then firmly secured in the litter. The tube means at the foot end is then inflated which causes the litter to assume a horizontal position from which the litter with swimmer is lifted from the water.

---

The invention described herein may be manufactured and used by or for the Government of the United States of America for governmental purposes without the payment of any royalties thereon or therefor.

This invention relates to life saving apparatus and more particularly to floatable stretchers or litters for rescuing injured persons from water.

The transportation of injured persons from the water to surface vessels or rescue aircraft, and also from the vessel or aircraft to a land facility where first aid may be administered, has always presented difficulties due to the possibility of further injury to the rescuee. Even in quiet seas the removal of seriously injured persons from the water is accompanied by the danger of compounding a fracture or aggravating other injuries. This is particularly true in cases of back or spine injuries and long bone fractures, since even with the greatest possible care and gentleness, the handling of such injured persons without creating additional pain or injury is very difficult.

In the past the Stokes type stretcher has been used on ships for transporting injured persons because of its side frames which keep the rescuee from rolling out, and also because of its rigid frame construction which is beneficial in preventing further injury to the spine and fractured limbs. This stretcher, however, is nonbuoyant in the water because of its metal construction, and is additionally difficult to handle and maneuver. It does, however, present the general requirements for a rescue device in that it is ideally suited for persons having the aforementioned types of injuries.

It is most common for an injured persons when floating in the water to do so in a substantially vertical position with only his head or face protruding above the surface. This is particularly true in the case of pilots, astronauts, or naval personnel, since they are usually wearing either a pressure suit or some type of life preserver, both of which inherently cause the individual to float in a nearly vertical, foot-down position. Since the injuries which are present quite often render the individual helpless, an optimal rescue device would enable him to be placed therein while in the vertical position and require little, if any, assistance from the injured person. The device would substantially eliminate the need for lifting movements such as are necessary to get into a raft, and would further include means for immobilizing the injured person to preclude aggravation of the injury by his own movements once he is in the device. The instant invention is directed to a rescue litter encompassing all of these characteristics. The device, which utilizes the aforementioned Stokes type litter, comprises two small pneumatic cells on each side and a large pneumatic cell connected to and extending around three of the litter's four sides. When the injured person is sighted, the small pneumatic cells are inflated and the litter is dropped into the water beside him. Due to the buoyancy of the cells and their position on the litter, the latter is caused to float in a substantially vertical position, thereby enabling an accompanying rescue team to gently position the floating litter against the back of the rescuee. When it is appropriately placed, a strap integrally attached to the litter frame may be loosely buckled across the rescuee's chest. At that time the larger pneumatic cell is inflated, thereby causing the foot end of the litter to move gently and slowly from the substantially vertical position to the surface of the water, carrying the rescuee, of course, with it. The rescuee may then be secured by means of other straps, and a life line attached to appropriate connections on the litter. He is then raised to the waiting rescue vehicle which may be a ship, seaplane, or helicopter, for example.

Aside from its simplicity and minimization of further injury, rescue by means of the subject invention presents many advantages. It enables immediate rendering of first aid as soon as the injured person is brought to the water's surface. For example, mouth-to-mouth resuscitation may be administered when the litter is on the water's surface, thus prior to the rescuee's complete retrieval to the vehicle. Tourniquets may be applied, if necessary, to preclude hemorrhaging or further loss of blood. The stability characteristic which results from the low center of gravity inherent in the heavy frame construction not only reduces roll on relatively calm water, but substantially precludes capsizing in high waves where prior art litters could not be used.

These, together with other ancillary advantages and features of the invention, will become apparent upon a reading of the following detailed description, accompanying claims, and drawings wherein:

FIG. 1 shows a perspective view of the litter assembly in the inflated, operative condition as it is hoisted from the water;

FIG. 2 shows a side view of the litter with the pneumatic cells and U-collar in uninflated condition;

FIG. 3 shows a perspective cutaway view of one of the pneumatic head cells, uninflated, while in its protective cover;

FIG. 4 shows a perspective cutaway view of the inflated head cell and opened protective cover;

FIG. 5 shows a cross section view along the line 5—5 of FIG. 4 of an inflated head cell and open cover, both with relation to the upper perimeter bar of the litter;

FIG. 6 shows a perspective cutaway view of the uninflated U-collar while in its protective cover;

FIG. 7 shows a perspective view of the U-collar for the improved litter assembly.

FIG. 8 shows in cross section the relationship of the U-collar to the litter assembly when the former is in the inflated condition;

FIGS. 9-12 illustrate the deployment and recovery method used with the improved litter assembly of the invention.

Figure 11:
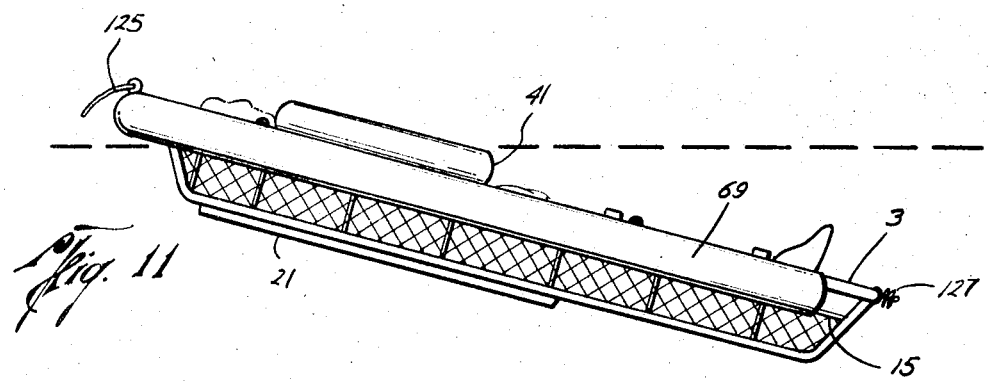

With reference now to FIG. 1, the Stokes litter is indicated generally at 1 and comprises in conventional form an upper perimeter bar 3 and a series of bracing bars 5 perpendicularly arranged thereto. Bracing bars 5 are in turn each connected to lower support bars 7, 9 which run in the longitudinal direction of the litter. Each of the bars 7 and 9 is connected at their ends to perimeter bar 3. Extending longitudinally down the central portion of the litter is leg separator bar 11. This bar extends only approximately one-half way of the litter's length. Also disposed in bracing relationship around the litter is the lower perimeter bar 15 which is connected to each of the brace bars 5 by welding or other appropriate means. Additionally, diagonally disposed brace bars 17 are at one end welded to the intersection of perimeter bar 3 and brace bars 5 and at their other end to the adjacent brace bar 5. Other structural bracing arrangements may be provided if deemed appropriate.

Disposed on the underside of the litter at the head end is a wooden support rack 21 the function of which is to act as a skid and to maintain the rescuee's back in flat position. Affixed on the interior of the litter is a sheet of wire mesh for more even distribution of torso weight. The wire mesh is connected to the lower perimeter bar 15 and thus covers not only the bottom, but part of the sides. Attached to the upper perimeter bar 3 as by welded eye-loops are four hoist strap hooks 25. The hoist strap hooks are of annular configuration and receive conventional snap hooks which are in turn connected to hoist straps 27, 29, 33, and 31 (the latter being obstructed from view). The head hoist straps 31, 33 are each connected to a single circular ring bar 35. The foot hoist straps 27, 29 are likewise connected to a circular ring bar 37. The head straps 31, 33 are of shorter length than foot straps 27, 29 so as to keep the litter in generally head up orientation while being raised.

With reference to FIG. 2 it is seen that the identical but uninflated litter buoyancy cells 41, (42) are disposed generally at the head end of the litter at approximately the same location as the rescuee's arms would lie when he is in the litter. The cells are made from nylon-coated neoprene or other material exhibiting good abrasion and puncture resistant characteristics. Although their size may vary, it is found that a cylindrical cell twenty-four inches in length by four inches in diameter provides optimal results. In constructing each cell the material should be cut into two identical rectangular patterns to form a pair of half sections. As shown in FIGS. 3 and 4, these half sections 43, 45 are joined along central seam 49 by appropriate and reliable means such as a strong waterproof type adhesive. A valve stem 51 is built into the wall of each cell in a conventional and well-known manner. Also included on each cell is an emergency oral inflation tube 53 (FIG. 4) which may be used to maintain required pressure in the cell should a leak develop prior to inflation of the main cell or U-collar 69.

The upper seam of each of the cells, that is the seam 47 contacting upper bar 3, contains a series of apertures reinforced by annular metal rings (FIG. 4) which are clamped into the neoprene material in a manner well-known in the art.

When in the uninflated state, as shown in FIG. 3, each of the cells is disposed in a protective envelope 61 made of a nylon-coated neoprene material similar to the cell itself. The envelopes are approximately the same length as the cell and are sufficiently wide so as to encircle the cell when it is not inflated. Each envelope is folded along an upper inner edge which is disposed to coincide with the seam 49 of the cell. This edge likewise contains a series of apertures 59 therein, reinforced by metal rings 65 similar to those used in the cell seam. They are spaced apart so as to match in distance the cell aperture rings. The uninflated cell and envelope are laced to upper bar 3 by a cord means 60, as shown in FIG. 3. After the cells are positioned in the envelopes and both elements laced to bar 3, the cells are then folded within the envelope and the bottom portion of the envelope 61 wrapped around and engaged with its upper mating edge 63 by snap means 62.

A $CO_2$ cylinder is connected to the valve stem 51 on each cell and extends through a cutout 75 in the envelope cover 61. When the cell is inflated by actuating the cylinder, the cooperating snaps 62 on the edges are disengaged by the expanding force of the cell. The upper sheet 63 edge is forced back against perimeter bar 3 and, as shown in FIG. 5, tends to cushion the force exerted by cell sheet 43 thereon. The lower sheet 61 merely folds down in random manner, thus permitting the cells to assume a position above the bar 3 when the litter is in the water.

It is found that the 4" x 24" cells, when inflated with 16 grams of $CO_2$ will properly float a 20 pound Stokes stretcher in a head end up position. As previously noted, the specific position of the cells will determine the angle at which the stretcher floats. With the end of each cell positioned approximately 12 inches from the head end of the litter, a 60 degree floating angle is achieved and the head section is maintained at the desired one foot above the water's surface.

The U-collar or main flotation tube is constructed in a manner similar to that of the pneumatic head cells except, of course, for the difference in size and shape. It is approximately eight inches in diameter at the head end of the litter and tapers to a six inch diameter at each foot end. This provides a total volume in this tube of about four cubic feet when inflated to two p.s.i.g., and is found to easily support up to a maximum of 250–300 pounds of dead weight on the water. As best shown in FIGS. 7 and 8, it comprises upper and lower U-shaped portions 81 and 83, respectively, which are joined along the central horizontal seam 91. Internally of the seam is a reinforcer strip for precluding seam shear. That portion of the seam adjacent the litter includes loops 85 sewn thereto. The loops are disposed approximately every four inches around the internal perimeter of the collar and are used to receive the cord 113 for attachment to the litter. An appropriate $CO_2$ cylinder 93, as described above, is positioned in a pocket means 95 formed by an additional piece of cell material joined as by adhesive to the collar wall at the head end on the surface side. The cylinder is connected to valve 97 adjacent thereto. As with the head cells there is also provided an emergency oral inflation tube 99 in case of malfunction of the cylinder.

The collar, as shown best in FIG. 6, when uninflated is also stored within a protective envelope made from the same material as the cell envelopes. It likewise consists of an upper flap 105 and lower flap 103 separated by the folded longitudinal seam 107. A series of metal rings 109 are clamped into place along seam 107 so as to align with loops 85 in the collar seam. The collar and loops are then threaded into each envelope ring and a nylon cord 113 is then laced through the loops (see FIGS. 6 and 8). The cord 113 is then tied to the bar 15 of the litter in the same manner as previously described. The uninflated U-collar is folded entirely within the envelope and the bottom flap 103 brought around its exterior portion and connected to the top flap 105 by means of the snap type fasteners 115.

Laterally spaced along the length of the litter is a series of standard seat belt type straps 119 (see FIG. 1) having conventional quick release buckles. Although shown in buckled condition, the straps will, upon deployment of the litter to the water, be unbuckled and in reefed or retracted position. The straps, which are preferably four in number, are attached to the upper perimeter bar 3 by standard metal overlap buckles 121, and are disposed at positions near the ankles, knees, stomach, and chest of the rescuee so as to substantially immobilize him during the rescue operation. The hands and arms of the rescuee should be disposed under the chest and stomach straps unless he is not badly injured, in which case he can assist in buckling the belts. In order to avoid confusion during the loading operation in the water it is found helpful to color code the straps such as by making the body straps 119 red, and the hoisting straps 27, 29, 31, and 33 blue.

Figure 12:
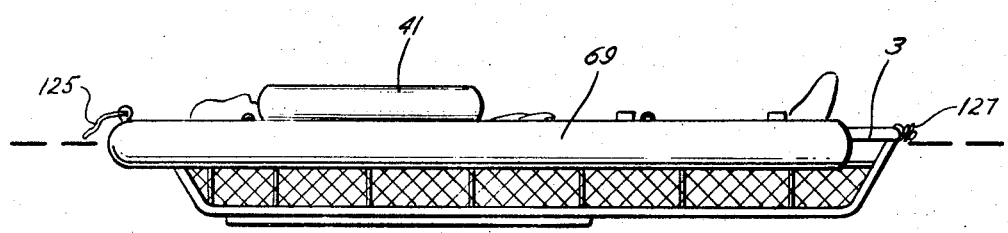

The procedure for utilizing the improved rescue litter of the invention is as follows. The helicopter, ship, seaplane or other rescue vehicle carrying a rescue team, homes-in on the descending pilot, astronaut, or other rescuee generally by means of a small beacon transmitter or by visual observation. Normally the rescue team will reach the rescuee soon after he lands in the water. When the team reaches the location, the litter is made ready by actuating the $CO_2$ cylinders on the head cells and, as shown in FIG. 9, it is dropped from the rescue vehicle into the water near the rescuee. When the litter stabilizes it will float, as shown in FIG. 10, in a foot-down position at approximately a 60° angle to the surface. If the rescuee is not capable of positioning himself in the litter, the rescue swimmers retrieve and position the litter behind him. As soon as it is appropriately positioned the chest strap is fastened to hold the rescuee against the litter structure. Alternatively, the rescuee may merely be held against the litter by the rescue swimmers during the inflation process of the U-collar. In either event, when the rescuee is in the proper position with respect to the litter, collar inflation is initiated by pulling an extending lanyard 125 hanging from the $CO_2$ cylinder at the head end of the collar. The lanyard should be of sufficient length so as to be easily located. During or immediately after the inflation process, which generally takes from 45 to 60 seconds, the ankles, knees, stomach, and chest belts are all secured. The rescuee may or may not assist in the strapping procedures, depending on the extent of injuries. During this time the foot end of the litter is, of course, moving from the foot-down position to a generally horizontal, floating condition, as shown in FIG. 11. When the litter has attained the floating stage, as shown in FIG. 12, and all belts are secure, a hoist cable from the rescue vehicle is positioned and the litter support straps 27, 29, 31, and 33 are hooked thereon, as shown in FIG. 1. In order to preclude swinging or rotating movement of the litter as it is raised, a stabilizing nylon cord 127 or other similar means is provided at the foot end of the litter and held in reefed condition by a snap strap wound therearound. Prior to raising of the litter from the water (see FIG. 1), one of the rescue swimmers moves to the foot end and unsnaps the stabilizing strap 127 and holds its end taut as the rescuee is raised to the vehicle. As he is brought into the rescue vehicle, other personnel may unhitch the stabilizing strap from the foot end and drop it into the water.

If the bulk of the head cells or collar presents a problem upon entry into the rescue vehicle, they may be quickly deflated or punctured with a knife. Due to the rigid nature of the litter emergency treatment may be performed directly thereon while the rescuee is being transferred to the necessary facilities.

Figure 13:
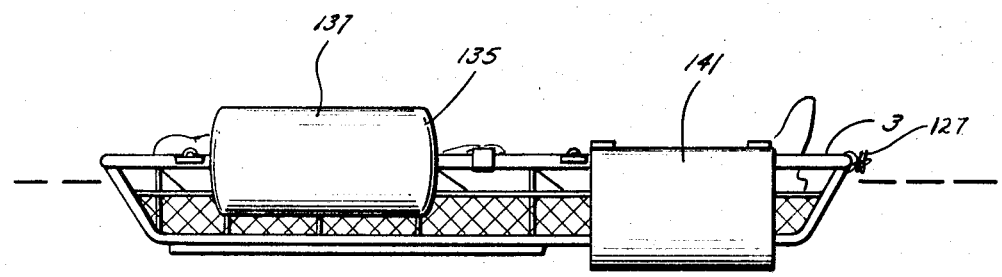
FIG. 13 shows a side view of a modified form of the invention.

Obviously many modifications and variations of the present invention are possible in light of the teachings herein. It is feasible, for example, to replace the pneumatic head cells with permanently buoyant members such as a cork-like cell, polyurethane foam cell, or other equivalent materials. The U-collar disclosed above may also, for example, be replaced by an inflatable tube disposed at or near the foot end, or by a pair of tubes, one disposed on each side of the litter at the foot end. An example of such a modified litter is shown in FIG. 13 wherein foam cells 135, 137 are disposed at or near the head end of the litter and on each side thereof, and an inflatable raising member 141, U-shaped in vertical cross section, is disposed at the foot end so as to bring the litter to the water's surface.

In view of the above teachings it should be recognized that the cells for floating the litter may vary, not only in size, shape, and material, but also location, the significant feature being their ability to float and to raise the litter to a surface floating position after it has been placed in the water. It is apparent, therefore, that all such improvements, variations, and modifications lie within the province and scope of the instant invention and that it may therefore be practiced otherwise than as specifically explained.

What is claimed and described to be secured by Letters Patent is:

1. A floatable rescue device for supporting a person in the water and retrieving him therefrom comprising:
   a litter means having a head end and a foot end and adapted to support said person;
   buoyancy means connected to the litter at said head end for normally floating said litter in a substantially vertical position with respect to the surface of the water with a portion of said head end thereabove whenever said litter means is in the water;
   inflatable tube means attached to the litter proximate said foot end, said inflatable tube means normally being in a deflated condition when said rescue device is initially placed in the water;
   means connected to said inflatable means for inflating said tube means while said litter floats substantially vertical whereby said tube means upon inflation will cause said litter to move to a substantially horizontal position with respect to the surface of the water.

2. A floatable rescue device as set forth in claim 1 wherein said bouyancy means comprises:
   a second inflatable tube means which is normally inflated before said litter is positioned in the water.

3. A floatable rescue device as set forth in claim 2 including:
   individual protective covering means for enclosing both of said inflatable tube means and being adapted to open upon inflation of said tube means.

4. A floatable rescue device as set forth in claim 3 including:
   means on said litter means for lifting said litter means out of the water.

5. A floatable rescue device as set forth in claim 4 wherein said litter means is a Stokes litter.

References Cited
UNITED STATES PATENTS

| | | | |
|---|---|---|---|
| 2,010,371 | 8/1935 | Perri | 9—11 X |
| 2,519,376 | 8/1950 | Jennings | 9—11 |
| 2,722,697 | 11/1955 | Wilkinson | 9—11 |
| 2,752,977 | 7/1956 | Clarke et al. | 9—11 X |
| 3,133,295 | 5/1964 | Klingensmith | 9—11 |

MILTON BUCHLER, *Primary Examiner.*

T. W. BUCKMAN, *Assistant Examiner.*